(12) United States Patent
Ito et al.

(10) Patent No.: US 12,145,391 B2
(45) Date of Patent: Nov. 19, 2024

(54) INK SET, RECORDING METHOD, AND RECORDING MEDIUM

(71) Applicant: Brother Kogyo Kabushiki Kaisha, Nagoya (JP)

(72) Inventors: Shinpei Ito, Nagoya (JP); Yasuhiro Taga, Kani (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 981 days.

(21) Appl. No.: 15/933,715

(22) Filed: Mar. 23, 2018

(65) Prior Publication Data

US 2018/0311988 A1 Nov. 1, 2018

(30) Foreign Application Priority Data

Apr. 28, 2017 (JP) ................. 2017-089594

(51) Int. Cl.
| | |
|---|---|
| *B41M 5/52* | (2006.01) |
| *B41M 5/00* | (2006.01) |
| *B41M 7/00* | (2006.01) |
| *C08F 26/06* | (2006.01) |
| *C09D 11/106* | (2014.01) |
| *C09D 11/328* | (2014.01) |
| *C09D 11/40* | (2014.01) |

(52) U.S. Cl.
CPC ........ *B41M 5/5245* (2013.01); *B41M 5/0017* (2013.01); *B41M 5/0047* (2013.01); *C08F 26/06* (2013.01); *C09D 11/106* (2013.01); *C09D 11/328* (2013.01); *C09D 11/40* (2013.01); *B41M 7/009* (2013.01)

(58) Field of Classification Search
CPC .... C09D 11/30; C09D 11/328; B41M 5/5245; C08F 26/06
See application file for complete search history.

(56) References Cited

U.S. PATENT DOCUMENTS

| | | | |
|---|---|---|---|
| 8,016,404 B2 | 9/2011 | Kato et al. | |
| 2004/0059020 A1* | 3/2004 | Kamoto | C09D 11/30 523/160 |
| 2007/0031615 A1* | 2/2007 | Nair | G03G 7/008 428/32.38 |
| 2008/0241398 A1 | 10/2008 | Kato et al. | |
| 2009/0258203 A1* | 10/2009 | Aoyama | B41J 29/02 428/207 |

(Continued)

FOREIGN PATENT DOCUMENTS

| | | |
|---|---|---|
| JP | 2000-281947 A | 10/2000 |
| JP | 2003-127351 A | 5/2003 |
| JP | 2008-246821 A | 10/2008 |

(Continued)

OTHER PUBLICATIONS

Machine Translation of JP 2013-245331 A (Year: 2013).*

(Continued)

*Primary Examiner* — Christopher M Polley
*Assistant Examiner* — Sathavaram I Reddy
(74) *Attorney, Agent, or Firm* — Banner & Witcoff, Ltd.

(57) ABSTRACT

An ink set includes: a water-based ink for ink-jet recording that contains water and at least one of a direct dye and an acid dye; and a fixing agent that contains a water-soluble polymer having diallyl amines as a constituent unit.

13 Claims, 3 Drawing Sheets

(56) References Cited

U.S. PATENT DOCUMENTS

2014/0002539 A1* 1/2014 Goto .................... C09D 11/322
  347/20
2015/0259552 A1* 9/2015 Fukaya ................ C09D 11/322
  536/112

FOREIGN PATENT DOCUMENTS

| JP | 2010-162726 A | 7/2010 |
|----|---------------|--------|
| JP | 2013-245331 A | 12/2013 |
| JP | 2016-196117 A | 11/2016 |

OTHER PUBLICATIONS

Nov. 17, 2020—Notice of Reasons for Rejection—JP Application 2017-089594—Eng Trans.
May 6, 2021—Notice of Reasons for Rejection—JP Application 2017-089594—Eng Trans.

* cited by examiner

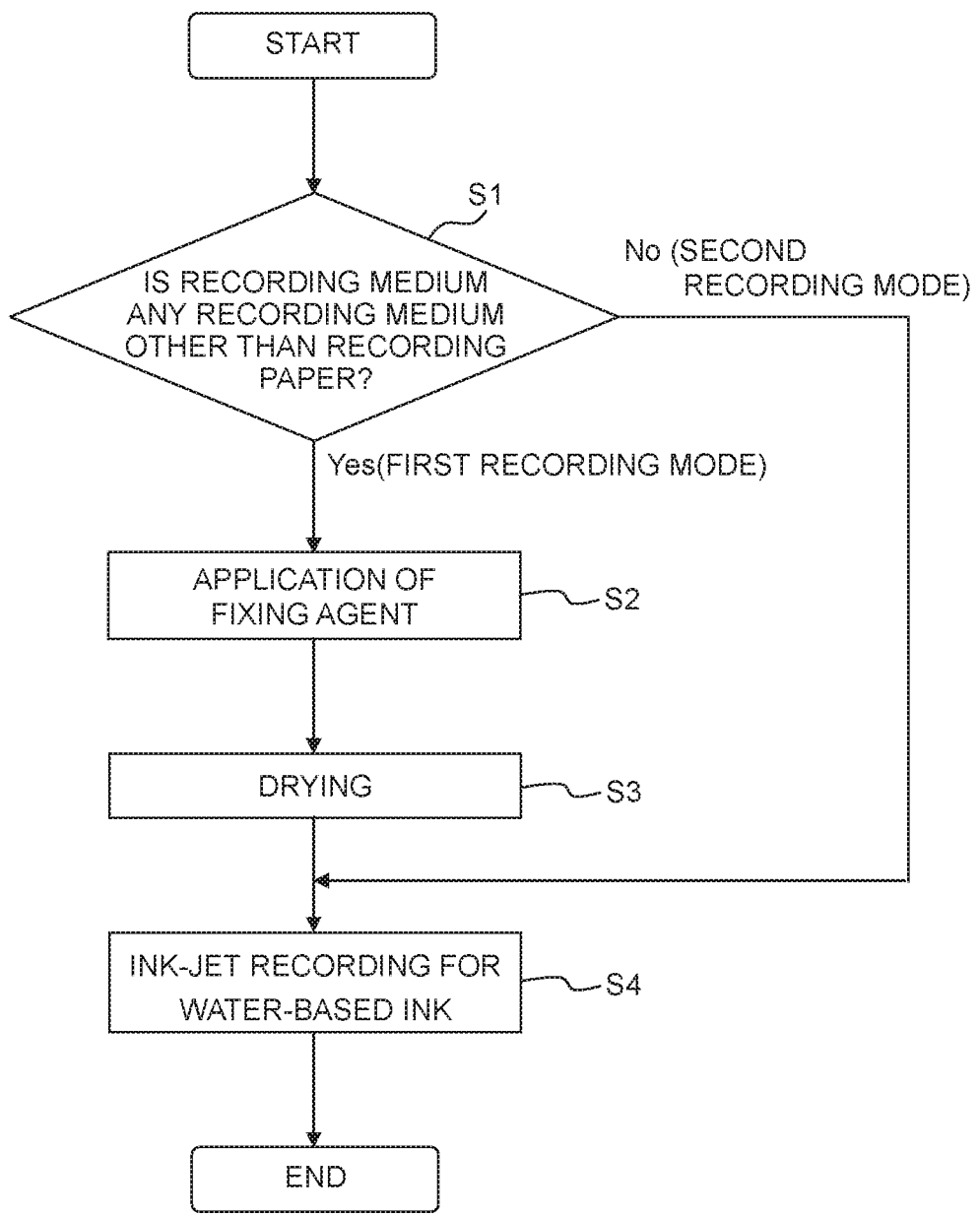

INK SET, RECORDING METHOD, AND RECORDING MEDIUM

CROSS REFERENCE TO RELATED APPLICATION

The present application claims priority from Japanese Patent Application No. 2017-089594 filed on Apr. 28, 2017, the disclosure of which is incorporated herein by reference in its entirety.

BACKGROUND OF THE INVENTION

Field of the Invention

The present invention is related to an ink set, a recording method, and a recording medium.

Description of the Related Art

An ink-jet recording method has been suggested, in which printing is performed by using a water-based ink containing a dye (hereinafter referred to as "water-based dye ink" in some cases) on regular paper such as sheets of copy paper and report pad (Japanese Patent Application Laid-open No. 2003-127351).

However, a new ink-jet recording method based on the use of a water-based dye ink is demanded, which also makes it possible to perform the recording on a recording medium such as cloth (fabric) or the like other than the recording paper such as the regular paper or the like, in addition to the recording on the recording paper. In this case, if the water-based dye ink, which is directed to the recording paper, is merely diverted to the recording on the cloth, the color is lost when the cloth is washed with water. Further, it is also required that the color change (color difference) is small between when recording is performed on the recording paper and when recording is performed on the cloth, and that the change in texture or tactile sensation, such as hand feeling, before and after recording is small when the recording is performed on the cloth.

In view of the above, an object of the present teaching is to provide an ink set including a water-based ink for ink-jet recording which can be utilized both for recording on recording paper and recording on any other recording medium than the recording paper, and a fixing agent.

SUMMARY OF THE INVENTION

According to a first aspect of the present teaching, there is provided an ink set including: a water-based ink for ink-jet recording containing water and at least one of a direct dye and an acid dye; and a fixing agent containing a water-soluble polymer having diallyl amines as a constituent unit.

According to a second aspect of the present teaching, there is provided a recording method of performing recording on a recording medium by use of an ink set which includes a water-based ink for ink-jet recording and a fixing agent, the method including: applying the fixing agent on the recording medium in a case that the recording medium is a recording medium other than recording paper, and jetting the water-based ink on the recording medium based on an ink-jet system, wherein the water-based ink contains a dye and water, and the fixing agent contains a water-soluble polymer having diallyl amines as a constituent unit.

According to a third aspect of the present teaching, there is provided a recording medium including: a base material and a coating layer formed on the base material and containing a water-soluble polymer having diallyl amines as a constituent unit.

BRIEF DESCRIPTION OF THE DRAWINGS

FIG. 3 is a flowchart indicating the recording method of the present teaching.

DESCRIPTION OF THE EMBODIMENTS

<Ink Set>

Figure 1:
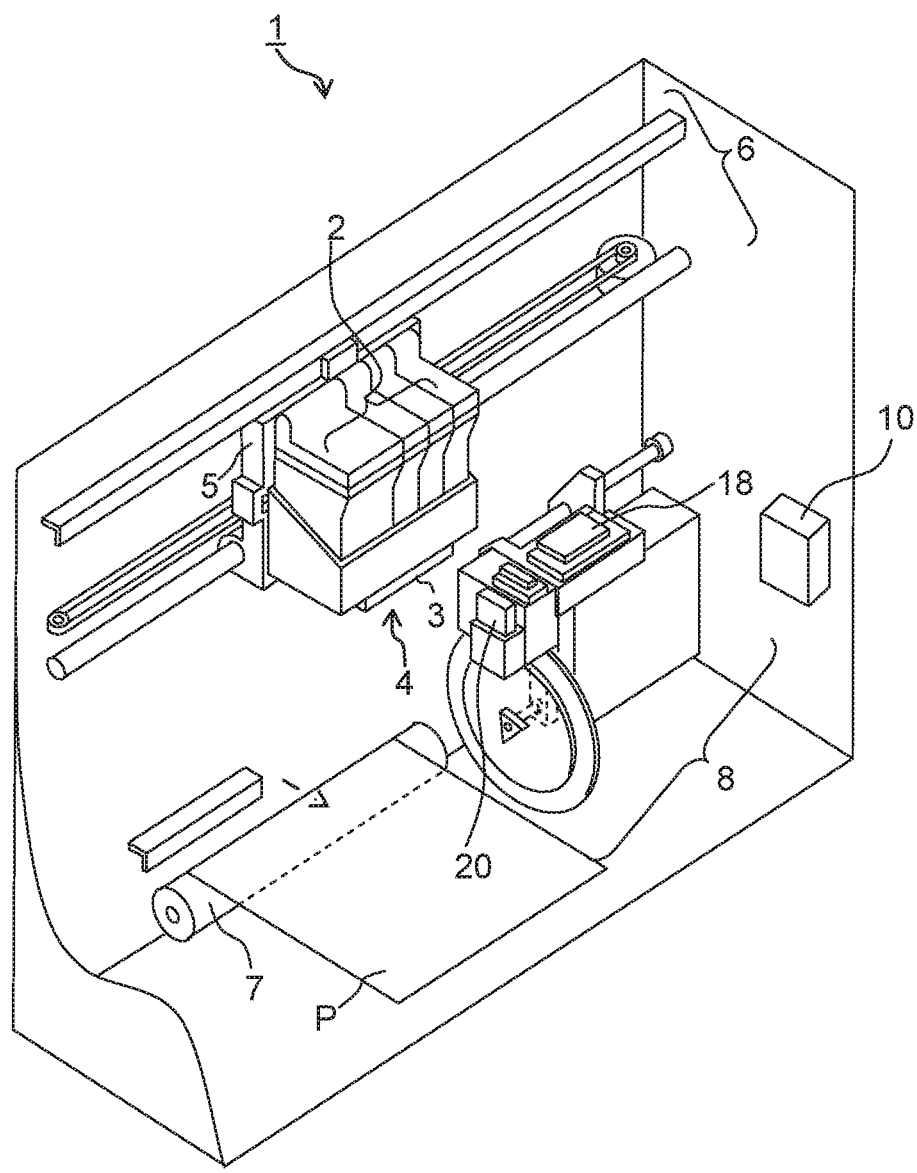
FIG. 1 is a schematic perspective view of an exemplary structure of an ink-jet recording apparatus of the present teaching.

An ink set of the present teaching is explained. The ink set of the present teaching includes a water-based ink for ink-jet recording (hereinafter referred to as "water-based ink" or "ink" in some cases) and a fixing agent. The ink set of the present teaching includes a water-based dye ink that contains at least one of a direct dye and an acid dye and a fixing agent that contains a water-soluble polymer having diallyl amines as a constituent unit. Thus, the ink set of the present teaching can be used both for recording on recording paper and recording on any other recording medium than the recording paper.

<Water-Based Ink>

At first, the water-based ink is explained. The water-based ink contains water and at least one of a direct dye and an acid dye.

The direct dye is not particularly limited, which is exemplified, for example, by C. I. Direct Black, C. I. Direct Blue, C. I. Direct Red, C. I. Direct Yellow, C. I. Direct Orange, C. I. Direct Violet, C. I. Direct Brown, and C. I. Direct Green. The C. I. Direct Black is exemplified, for example, by C. I. Direct Blacks 17, 19, 32, 51, 71, 108, 146, 154, and 168. The C. I. Direct Blue is exemplified, for example, by C. I. Direct Blues 6, 22, 25, 71, 86, 90, 106, and 199. The C. I. Direct Red is exemplified, for example, by C. I. Direct Reds 1, 4, 17, 28, 83, and 227. The C. I. Direct Yellow is exemplified, for example, by C. I. Direct Yellows 12, 24, 26, 86, 98, 132, 142, and 173. The C. I. Direct Orange is exemplified, for example, by C. I. Direct Oranges 34, 39, 44, 46, and 60. The C. I. Direct Violet is exemplified, for example, by C. I. Direct Violets 47 and 48. The C. I. Direct Brown is exemplified, for example, by C. I. Direct Brown 109. The C. I. Direct Green is exemplified, for example, by C. I. Direct Green 59.

The acid dye is not particularly limited, which is exemplified, for example, by C. I. Acid Black, C. I. Acid Blue, C. I. Acid Red, C. I. Acid Yellow, C. I. Acid Orange, and C. I. Acid Violet. The C. I. Acid Black is exemplified, for example, by C. I. Acid Blacks 2, 7, 24, 26, 31, 52, 63, 112, and 118. The C. I. Acid Blue is exemplified, for example, by C. I. Acid Blues 9, 22, 40, 59, 90, 93, 102, 104, 117, 120, 167, 229, and 234. The C. I. Acid Red is exemplified, for example, by C. I. Acid Reds 1, 6, 32, 37, 51, 52, 80, 85, 87, 92, 94, 115, 180, 256, 289, 315, and 317. The C. I. Acid Yellow is exemplified, for example, by C. I. Acid Yellows 11, 17, 23, 25, 29, 42, 61, and 71. The C. I. Acid Orange is exemplified, for example, by C. I. Acid Oranges 7 and 19. The C. I. Acid Violet is exemplified, for example, by C. I. Acid Violet 49.

The blending amount of at least one of the direct dye and the acid dye in the entire amount of the water-based ink is not particularly limited, which is, for example, in a range of 0.1 to 20% by weight, in a range of 1 to 15% by weight, or in a range of 2 to 10% by weight. As for at least one of the direct dye and the acid dye, only one kind of the above examples may be used singly, or two or more kinds of the above examples may be used in combination.

The water is preferably ion-exchanged water or pure water (purified water). The blending amount of the water in the entire amount of the water-based ink may be, for example, a balance of the other components.

The water-based ink may further contain a water-soluble organic solvent. The water-soluble organic solvent is exemplified, for example, by a humectant that prevents the ink from drying at an end of a nozzle of an ink-jet head and a penetrant that adjusts the drying velocity on the recording medium.

The humectant is not particularly limited, which is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, and trimethylolethane; 2-pyrrolidone; N-methyl-2-pyrrolidone; and 1,3-dimethyl-2-imidazolidinone. The polyalkylene glycol is exemplified, for example, by polyethylene glycol and polypropylene glycol. The alkylene glycol is exemplified, for example, by ethylene glycol, propylene glycol, butylene glycol, diethylene glycol, triethylene glycol, dipropylene glycol, tripropylene glycol, thiodiglycol, and hexylene glycol. Only one kind of the humectant as described above may be used singly, or two or more kinds of the humectants may be used in combination. Among the above, the polyvalent alcohol such as alkylene glycol and glycerol is preferably used.

The blending amount of the humectant in the entire amount of the water-based ink is, for example, in a range of 0 to 95% by weight, in a range of 5 to 80% by weight, or in a range of 5 to 50% by weight.

The penetrant is exemplified, for example, by glycol ether. The glycol ether is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. Only one kind of the penetrant as described above may be used singly, or two or more kinds of the penetrants may be used in combination.

The blending amount of the penetrant in the entire amount of the water-based ink is, for example, in a range of 0 to 20% by weight, in a range of 0 to 15% by weight, or in a range of 1 to 6% by weight.

The water-based ink may further contain a conventionally known additive, as necessary. The additive is exemplified, for example, by surfactants, pH-adjusting agents, viscosity-adjusting agents, surface tension-adjusting agents, and fungicides. The viscosity-adjusting agents are exemplified, for example, by polyvinyl alcohol and cellulose.

The water-based ink may be prepared, for example, by mixing at least one of the direct dye the acid dye, the water, and optionally other additive component(s) as necessary uniformly or homogeneously through any conventionally known method and then removing undissolved matters by a filter or the like.

<Fixing Agent>

Next, the fixing agent is explained. The fixing agent contains a water-soluble polymer having diallyl amines as a constituent unit. The fixing agent is characterized by containing the water-soluble polymer, and any other composition of the fixing agent is not restricted at all. The water-soluble polymer may be a cationic polymer or an ampholytic polymer, and the water-soluble polymer is preferably the cationic polymer. The water-soluble polymer may be a water-soluble polymer having no cross-linking performance.

The water-soluble polymer is exemplified, for example, by a water-soluble polymer having diallyl amines represented by Formula (1) as a constituent unit and a water-soluble polymer having diallyl amines represented by Formula (2) as a constituent unit. If the water-soluble polymer does not have any other constituent unit than the diallyl amines represented by Formula (1) and the diallyl amines represented by Formula (2), it is possible to obtain an ink set in which the change in texture or tactile sensation, such as hand feeling, before and after recording is small when recording is performed on cloth (fabric). The water-soluble polymer is preferably a water-soluble polymer only having the diallyl amines represented by Formula (2) as a constituent unit. If the water-soluble polymer is the water-soluble polymer only having the diallyl amines represented by Formula (2) as a constituent unit, it is possible to obtain an ink set that makes the color change (color difference) small between when recording is performed on the recording paper and when recording is performed on the cloth.

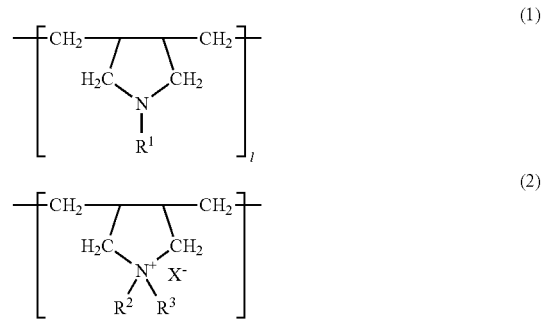

In Formula (1), $R^1$ may be an alkyl group or a hydrogen atom. The alkyl group may have, for example, 1 to 3, 1 or 2, or 1 of carbon atom(s). The alkyl group is exemplified, for example, by a methyl group, ethyl group, and isopropyl group. The alkyl group may have a substituent group such as a halogen atom. The alkyl group may have either a straight chain or a branched chain.

In Formula (2), each of $R^2$ and $R^3$ may be an alkyl group. Examples of the alkyl group are the same as or equivalent to those exemplified in relation to the alkyl group in Formula (1).

In Formula (2), $X^-$ is an anion. The anion is exemplified, for example, by methylsulfate ion, ethylsulfate ion, chloride ion, sulfate ion, acetate ion, phosphoric acid ion, citric acid ion, and amidosulfate ion.

The number (n) of the constituent units represented by Formula (1) in the water-soluble polymer is, for example, 5 to 1,000, 10 to 500, or 20 to 200. The number (n) of the constituent units represented by Formula (2) in the water-soluble polymer is, for example, 5 to 1,000, 10 to 500, or 20 to 200.

The weight-average molecular weight of the water-soluble polymer is, for example, 1,000 to 100,000, 2,000 to 50,000, or more than 5,000 but less than 20,000. When the weight-average molecular weight of the water-soluble polymer is more than 5,000 but less than 20,000, it is possible to obtain an ink set which makes the color change (color difference) small between when recording is performed on the recording paper and when recording is performed on the cloth, and which prevents color of the ink recorded on the cloth from being lost when the cloth is washed with water.

The water-soluble polymer may be privately prepared. Or, it is also allowable to use any commercially available product. The commercially available product is exemplified, for example, by "UNISENCE FPA 100 LU", "UNISENCE FPA 101LU", and "UNISENCE KCA 103LU" produced by SENKA corporation; and "PAS-M-1A", "PAS-21", "PAS-84", and "PAS-2451" produced by NITTOBO MEDICAL CO., LTD. The details of the commercially available products are as follows.

The UNISENCE FPA 100 LU is a water-soluble polymer having the diallyl amines represented by Formula (2) as a constituent unit, wherein each of $R^2$ and $R^3$ is a methyl group, $X^-$ is methylsulfate ion, and the weight-average molecular weight is more than 5,000 but less than 20,000.

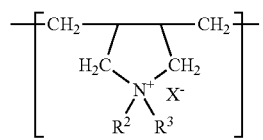
(2)

The UNISENCE FPA 101 LU is a water-soluble polymer having the diallyl amines represented by Formula (2) as a constituent unit, wherein each of $R^2$ and $R^3$ is a methyl group, $X^-$ is methylsulfate ion, and the weight-average molecular weight is 20,000 to 100,000.

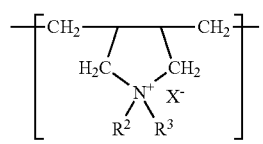
(2)

The UNISENCE KCA 103 LU is a water-soluble polymer having the diallyl amines represented by Formula (1) and a unit represented by Formula (3) as constituent units, wherein $R^1$ is a hydrogen atom and the weight-average molecular weight is 20,000 to 100,000. The number (m) of the constituent units represented by Formula (3) may be the same as the number (n) of the constituent units represented by Formula (1) in the water-soluble polymer.

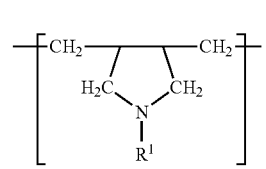
(1)

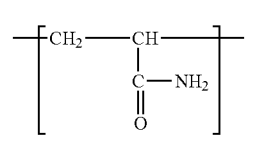
(3)

The PAS-M-1A is a water-soluble polymer having the diallyl amines represented by Formula (1) as a constituent unit, wherein $R^1$ is a hydrogen atom and the weight-average molecular weight is 20,000.

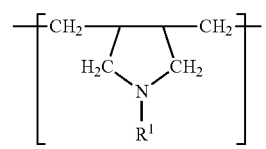
(1)

The PAS-21 is a water-soluble polymer having the diallyl amines represented by Formula (1) as a constituent unit, wherein $R^1$ is a hydrogen atom and the weight-average molecular weight is 5,000.

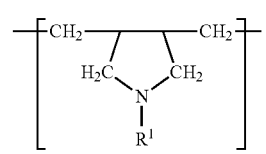
(1)

The PAS-84 is a water-soluble polymer having the diallyl amines represented by Formula (2), a unit represented by Formula (4), and a unit represented by Formula (5) as constituent units, wherein each of $R^2$ and $R^3$ is a methyl group, $X^-$ is chloride ion, and the weight-average molecular weight is 20,000. The number (o) of the constituent units represented by Formula (4) and the number (p) of the constituent units represented by Formula (5) may be the same as the number (n) of the constituent units represented by Formula (1) in the water-soluble polymer.

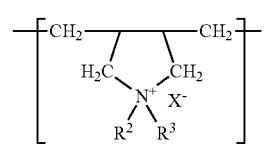
(2)

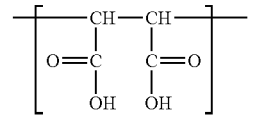
(4)

-continued

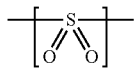
(5)

The PAS-2451 is a water-soluble polymer having the diallyl amines represented by Formula (2) and the unit represented by Formula (4) as constituent units, wherein $R^2$ is a methyl group, $R^3$ is an ethyl group, $X^-$ is ethylsulfate ion, and the weight-average molecular weight is 30,000. The number (o) of the constituent units represented by Formula (4) may be the same as the number (n) of the constituent units represented by Formula (1) in the water-soluble polymer.

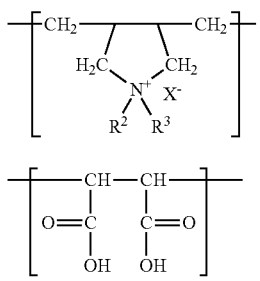

The fixing agent may or may not contain any other polymer than the water-soluble polymer having the diallyl amines as a constituent unit. The ratio of the water-soluble polymer having the diallyl amines as a constituent unit relative to the entire amount of polymers in the fixing agent exceeds, for example, 90% by weight. Namely, the ratio of polymer(s) other than the water-soluble polymer having the diallyl amines as a constituent unit relative to the entire amount of polymers in the fixing agent is, for example, less than 10% by weight. An upper limit of the ratio of the water-soluble polymer having the diallyl amines as a constituent unit relative to the entire amount of polymers in the fixing agent is not particularly limited, which may be 100% by weight. Namely, all of the polymers in the fixing agent may be the water-soluble polymer having the diallyl amines as a constituent unit.

The blending amount of the water-soluble polymer in the entire amount of the fixing agent is, for example, 1% by weight or more. The blending amount of the water-soluble polymer may be, for example, in a range of 1 to 40% by weight, in a range of 2 to 20% by weight, in a range of 4 to 10% by weight, or in a range of 5 to 10% by weight. When the blending amount of the water-soluble polymer is 5% by weight or more, it is possible to obtain an ink set which makes the color change (color difference) small between when recording is performed on the recording paper and when recording is performed on the cloth, and which prevents color of the ink recorded on the cloth from being lost when the cloth is washed with water.

The fixing agent may further contain water. The water is preferably ion-exchanged water or pure water (purified water). The blending amount of the water in the entire amount of the fixing agent may be, for example, a balance of the other components.

The fixing agent may further contain a water-soluble organic solvent. Examples of the water-soluble organic solvent may be the same as or equivalent to those exemplified in relation to the water-based ink. The blending amount of the water-soluble organic solvent in the entire amount of the fixing agent is, for example, in a range of 0 to 95% by weight, in a range of 5 to 80% by weight, or in a range of 5 to 50% by weight.

The fixing agent preferably contains substantially no colorant, such as dye and pigment, so as not to influence color of a recorded matter recorded by the ink set. The blending amount of the colorant in the entire amount of the fixing agent is, for example, in a range of 0 to 1% by weight or in a range of 0 to 0.1% by weight.

The fixing agent may further contain a conventionally known additive, as necessary. Examples of the additive may be the same as or equivalent to those exemplified in relation to the water-based ink. For example, the fixing agent may contain the humectant, penetrant, and water, wherein the humectant may be glycerol and the penetrant may be triethylene glycol n-butyl ether. The fixing agent may be, for example, in a liquid state (fixing liquid) or a gel state. The fixing agent in the liquid state (fixing liquid) or the gel state can be applied to a recording medium easily. When the fixing agent in the liquid state (fixing liquid) contains a solvent, such as water, the water-soluble polymer may be dissolved in the solvent.

The fixing agent may be prepared, for example, by mixing the water-soluble polymer and optionally other additive component(s) as necessary uniformly or homogeneously through any conventionally known method.

In the ink set of the present teaching, the ratio (P/D) of the blending amount (P: % by weight) of the water-soluble polymer having the diallyl amines as a constituent unit in the entire amount of the fixing agent relative to the blending amount (D: % by weight) of at least one of the direct dye and the acid dye in the entire amount of the water-based ink is, for example, 0.1 to 10, preferably 0.2 to 5, more preferably 1 to 2.5. When the ratio is in the above ranges and when the recording medium is cloth, color of the ink recorded on the cloth is prevented from being lost when the cloth is washed with water, and the ink set makes it possible to reduce the color change (color difference) small between when recording is performed on the recording paper and when recording is performed on the cloth. This effect may be provided by a phenomenon in which the direct dye and/or the acid dye interact(s) with the water-soluble polymer more efficiently.

In the ink set of the present teaching, the water-based ink and the fixing agent preferably contain the same humectant and/or the same penetrant. This prevents color of the ink recorded on the cloth from being lost when the cloth is washed with water, and makes it possible to reduce the color change (color difference) small between when recording is performed on the recording paper and when recording is performed on the cloth. This effect may be provided by a phenomenon in which the water-based ink blends well with the fixing agent on the recording medium. The penetrant is not particularly limited, and it is possible to use, for example, the above examples of the penetrant. Among the above, triethylene glycol n-butyl ether is preferably used. The humectant is not particularly limited, and it is possible to use, for example, the above examples of the humectant. Among the above, glycerol is preferably used. For the purpose of accelerating the above effects, in the ink set of the present teaching, the ratio (Y/X) of the blending amount (Y: % by weight) of the penetrant in the entire amount of the fixing agent relative to the blending amount (X: % by weight) of the penetrant in the entire amount of the water-based ink is, for example, 0.05 to 5, preferably 0.2 to 1; and the ratio (y/x) of the blending amount (y: % by weight) of the humectant in the entire amount of the fixing agent relative to the blending amount (x: % by weight) of the humectant in the entire amount of the water-based ink is, for example, 0.05 to 5, preferably 0.1 to 2.

However, the mechanisms as described above are merely estimated, and the present teaching is not limited thereto.

<Recording Method>

Next, the recording method of the present teaching is explained.

The recording method of the present teaching resides in a recording method for performing recording by using an ink set including a water-based ink for ink-jet recording and a fixing agent, the recording method including: a fixing agent application step of selecting, depending on a type of a recording medium, whether or not the fixing agent is applied and applying the fixing agent to the recording medium when application of the fixing agent is selected; and a recording step of jetting the water-based ink onto the recording medium by means of an ink-jet system to perform the recording. The water-based ink contains a dye and water. The fixing agent contains a water-soluble polymer having diallyl amines as a constituent unit. The fixing agent application step is characterized by selecting the application of the fixing agent when the recording medium is any other recording medium than recording paper. The recording includes, for example, letter printing, image printing, and print or printing.

In the recording method of the present teaching, the recording medium other than the recording paper is exemplified, for example, by cloth (fabric). The cloth includes both of knitted item and textile. The material of the cloth may be either natural fiber or synthetic fiber. The natural fiber is exemplified, for example, by cotton and silk. The synthetic fiber is exemplified, for example, by polyester, nylon, and acrylic.

The ink set used in the recording method of the present teaching is the same as or equivalent to the ink set of the present teaching described above except that the dye, which is contained in the water-based ink, is not limited to the direct dye and the acid dye. Thus, the explanation of the ink set of the present teaching described above can be incorporated in the ink set used in the recording method of the present teaching. The dye other than the direct dye and the acid dye is not particularly limited, which is exemplified, for example, by reactive dyes. Specified examples of the dye other than the direct dye and the acid dye are exemplified, for example, by C. I. Food Black. The C. I. Food Black is exemplified, for example, by C. I. Food Blacks 1 and 2.

In the recording method of the present teaching, the dye may be any dye and at least one of the direct dye and the acid dye is preferably used. When recording is performed on the recording paper by use of the direct dye and/or the acid dye, a satisfactory printed matter can be obtained. Further, since the direct dye and the acid dye contain a relatively large number of anion groups, it is assumed that they interact with the water-soluble polymer in the fixing agent more strongly. This prevents color of the ink recorded on the cloth from being lost when the cloth is washed with water, and makes it possible to reduce the color change (color difference) small between when recording is performed on the recording paper and when recording is performed on the cloth. As described above, when at least one of the direct dye and the acid dye is used as the dye, recording can be performed well both on the recording paper and any other recording medium than the recording paper.

The recording method of the present teaching can be carried out by using, for example, an ink-jet recording apparatus of the present teaching explained below.

The ink-jet recording apparatus of the present teaching resides in an ink-jet recording apparatus including an ink set accommodating section, a fixing agent application mechanism, and an ink jetting mechanism, wherein the ink set used in the recording method of the present teaching is accommodated in the ink set accommodating section, the fixing agent included in the ink set can be applied to the recording medium by the fixing agent application mechanism, and the water-based ink included in the ink set is jetted onto the recording medium by the ink jetting mechanism. The fixing agent of the ink set may not be accommodated in the ink set accommodating section. The fixing agent application mechanism may be a mechanism independently of the ink-jet recording apparatus instead of being arranged or provided in the ink-jet recording apparatus. When the fixing agent is not accommodated in the ink set accommodating section, the fixing agent may be applied to the recording medium by the fixing agent application mechanism independently of the ink-jet recording apparatus.

FIG. 1 depicts an exemplary structure of an ink-jet recording apparatus of the present teaching. As depicted in FIG. 1, an ink-jet recording apparatus 1 of the present teaching includes four ink cartridges (ink containers) 2, an ink-jet mechanism (ink-jet head) 3, a head unit 4, a carriage 5, a driving unit 6, a platen roller 7 and a purge device 8 as main constitutive components or parts. The ink-jet recording apparatus 1 includes a controller 10 including a CPU, ROM, RAM, and the like to control respective parts or components of the ink-jet recording apparatus 1.

Each of the four ink cartridges (ink containers) 2 contains the corresponding one of four water-based inks of yellow, magenta, cyan, and black. For example, at least one of the four water-based inks is the water-based ink included in the ink set. Although this example uses a set with the four ink cartridges 2, instead of this, the present teaching may use an integrated type ink cartridge of which interior is comparted to form a water-based yellow ink accommodating section, a water-based magenta ink accommodating section, a water-based cyan ink accommodating section, and a water-based black ink accommodating section. As a body of the ink cartridge, for example, any conventionally known main body (body) of an ink cartridge may be used.

The ink-jet head 3 disposed on the head unit 4 performs recording on a recording medium (for example, recording paper P). The recording medium may be a recording medium other than the recording paper P, such as cloth or fabric. The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821 corresponding to United States Patent Application Publication No. US2008/0241398 A1). The platen roller 7 extends in the reciprocating direction of the carriage 5 and is arranged to face the ink-jet head 3.

The purge device 8 sucks or draws unsatisfactory ink (poor ink) which contains air bubbles, etc., accumulated or trapped in the inside of the ink-jet head 3. As the purge device 8, it is possible to use, for example, a conventionally known purge device (for example, see Japanese Patent Application laid-open No. 2008-246821 corresponding to United States Patent Application Publication No. US2008/0241398 A1).

A wiper member 20 is provided on the purge device 8 at a position on the side of the platen roller 7 such that the wiper member 20 is adjacent to the purge device 8. The wiper member 20 has a spatula shape, and wipes a nozzle-formed surface of the ink-jet head 3 accompanying with the movement (reciprocating movement) of the carriage 5. In FIG. 1, a cap 18 is provided to cover nozzles of the ink-jet head 3 which is returned to a reset position upon completion of recording, so as to prevent the water-based inks from drying.

In the ink-jet recording apparatus 1 of the present embodiment, the four ink cartridges (ink containers) 2 are provided, together with the head unit 4, on one carriage 5. However, the present teaching is not limited to this. In the ink-jet recording apparatus 1, the respective four ink cartridges 2 may be provided on a carriage which is different (separate) from the carriage on which the head unit 4 is provided. Alternatively, the respective four ink cartridges 2 may be arranged and fixed inside the ink-jet recording apparatus 1, rather than being provided on the carriage 5. In such aspects, for example, the four ink cartridges 2 are connected to the head unit 4 provided on the carriage 5 by use of tubes, etc., and the water-based inks are supplied from the four ink cartridges 2, respectively, to the head unit 4 via the tubes. Further, in these aspects, it is allowable to use four ink bottles having a bottle shape, as ink containers, instead of using the four ink cartridges 2. In such a case, each of the ink bottles is preferably provided with an inlet port via which the ink is poured from the outside to the inside of the ink bottle.

Recording using the ink-jet recording apparatus 1 is carried out, for example, as follows (see FIG. 3). At first, it is selected whether to apply the fixing agent included in the ink set depending on the kind of the recording medium. When application of the fixing agent is selected, the fixing agent is applied to the recording medium. The selection is performed by, for example, a user. Specifically, the user selects any of "printing on a medium other than recording paper (first recording mode)" and "printing on recording paper (second recording mode)" on a user interface, such as a panel provided in the ink-jet recording apparatus 1. The controller 10 may determine which of the first recording mode and the second recording mode is executed, based on a signal inputted from the user interface. Or, the controller 10 may determine which of the first recording mode and the second recording mode is executed, based on a flag corresponding to the mode selected on the user interface. Specifically, for example, when the user selects the first recording mode, the flag corresponding to the first recording mode is stored in a storage area, such as a RAM of the controller 10. When the flag is stored in the storage area, the controller 10 may execute the first recording mode.

Figure 2A:
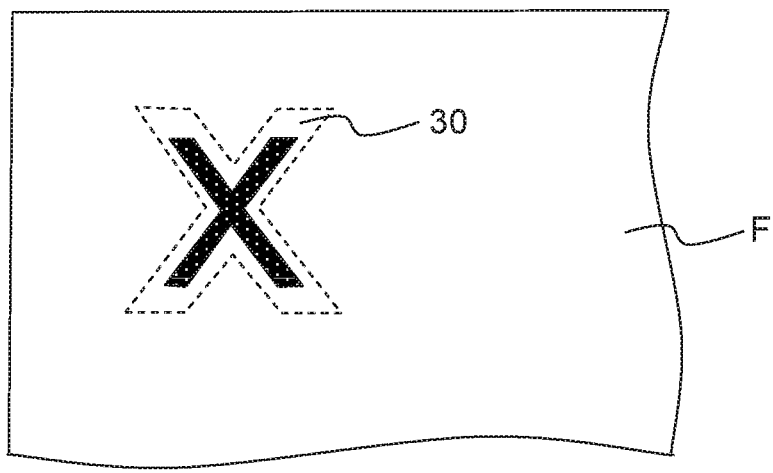
FIGS. 2A and 2B depict examples of recording performed by a recording method of the present teaching.
Figure 2B:
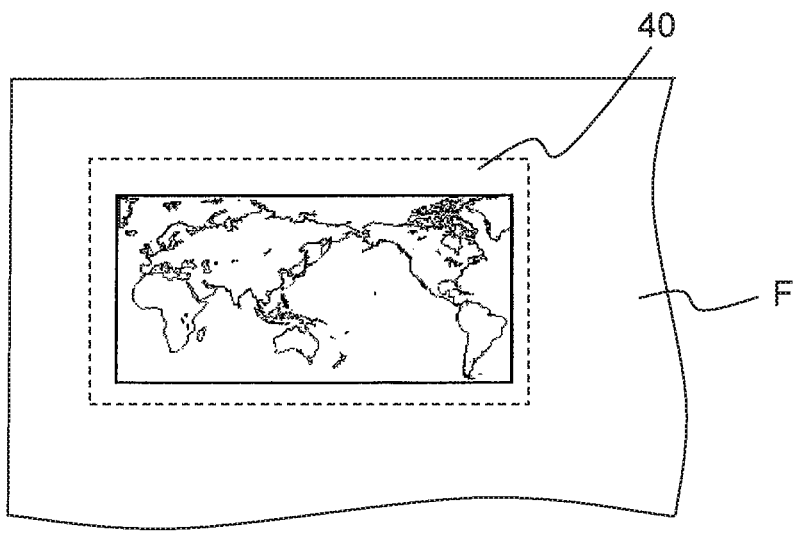

When the recording medium is any other recording medium (for example, cloth or the like) than the recording paper P (step S1 of FIG. 3: Yes), the fixing agent is applied to the recording medium (step S2 of FIG. 3). In the present teaching, the application of the fixing agent can be carried out, for example, by means of a spray system, stamp application, brush application, roller application, and the ink-jet system. The fixing agent may be applied to the entire part or a part of the recording surface of the recording medium. When the fixing agent is applied to the part of the recording surface, at least a recording portion, of the recording surface of the recording medium, recorded by using the water-based ink is an application portion. When the fixing agent is applied to the part of the recording surface, the size of the application portion is preferably larger than the recording portion. For example, as depicted in FIG. 2A, when a letter (X) is recorded on a recording medium F, the fixing agent is preferably applied so that an application portion 30 has a line width which is larger than a line width of the letter. Further, as depicted in FIG. 2B, when a pattern is recorded on the recording medium F, the fixing agent is preferably applied so that an application portion 40 is larger than the pattern.

For example, when the recording medium is any other recording medium than the recording paper P, the recording method of the present teaching may further include, before jetting of the water-based ink and after the fixing agent application step, a drying step of heat-treating and drying the recording medium at a temperature of not more than 210° C. (step S3 of FIG. 3). The lower limit value of the heat treatment temperature in the drying step is not particularly limited, which is, for example, not less than 80° C. Drying the fixing agent prevents blurring of the water-based ink to be jetted on the recording medium in a subsequent step (step S4 of FIG. 3). Further, drying the fixing agent makes the color change (color difference) small between when recording is performed on the recording paper P and when recording is performed on the cloth. This effect may be obtained by the following mechanism. Namely, drying a treatment agent prevents the water-based ink to be jetted in the subsequent step (step S3 of FIG. 3) from excessively permeating the recording medium (cloth or the like) in a depth direction.

Subsequently, the water-based ink is jetted from the ink-jet head 3 onto the recording medium (step S4 of FIG. 3). In this procedure, when the recording medium is any other recording medium than the recording paper P, the water-based ink is jetted onto the application portion of the fixing agent.

In this embodiment, when the recording medium is any other recording medium than the recording paper P, the fixing agent is used as a pretreatment agent applied to the recording medium prior to jetting of the water-based ink. However, the present teaching is not limited thereto. In the present teaching, the water-based ink may be jetted onto the recording medium first, and then the fixing agent may be applied thereto. Alternatively, it is also allowable to simultaneously perform application of the fixing agent and jetting of the water-based ink to the recording medium.

When the recording medium is the recording paper P (step S1 of FIG. 3: No), the recording step is executed by using the water-based ink without executing the fixing agent application step and the drying step (step S4 of FIG. 3).

As described above, the recording method of the present teaching includes determining which of the first recording mode and the second recording mode is executed based on the kind of the recording medium (step S1 of FIG. 3). In the recording method of the present teaching, the first recording mode includes applying the fixing agent on the recording medium (step S2 of FIG. 3) and jetting the water-based ink on the recording medium by means of the ink-jet system (step S4 of FIG. 3), and the second recording mode includes jetting the water-based ink on the recording medium by means of the ink-jet system without applying the fixing agent to the recording medium (step S4 of FIG. 3).

The recording medium, which has been subjected to recording as described above, is ejected or discharged from the ink-jet recording apparatus 1. According to the present teaching, even when recording is performed on the cloth in place of the recording paper P, color of the water-based ink is prevented from being lost when the cloth is washed with water. It is estimated that the effect to prevent the color loss is obtained by the following mechanism. Namely, since the dye contained in the water-based ink is typically anionic, the electric charge of the dye is counteracted to achieve the non-aqueous state by the water-soluble polymer in the fixing agent, which enhances the water resistance. Further, according to the present teaching, the color change (color difference) is small between when recording is performed on the recording paper P and when recording is performed on the cloth. The degree of permeation of the water-based ink in the cloth in the depth direction is typically larger than the degree of permeation of the water-based ink in the recording paper P in the depth direction. This difference in degrees of permeation of the water-based ink between the cloth and the recording paper P may cause the color change (color difference) between when recording is performed on the recording paper P and when recording is performed on the cloth. In the present teaching, using the water-based ink together with the fixing agent prevents the water-based ink from excessively permeating the recording medium (cloth or the like) in the depth direction, which makes the color change (color difference) small between when recording is performed on the recording paper P and when recording is performed on the cloth. In the present teaching, the change in texture or tactile sensation, such as hand feeling, before and after recording is small when recording is performed on the cloth. This effect may be provided by a phenomenon in which the water-soluble polymer having diallyl amines as a constituent unit contained in the fixing agent does not become hard after drying the fixing agent. However, the mechanisms as described above are merely estimated, and the present teaching is not limited thereto. Note that in FIG. 1, a paper supply mechanism and a paper discharge mechanism for the recording paper P are omitted from the illustration.

The apparatus depicted in FIG. 1 adopts the serial type ink-jet head. However, the present teaching is not limited thereto. The ink-jet recording apparatus may be an apparatus which adopts a line type ink-jet head.

<Recording Medium>

Next, the recording medium of the present teaching is explained.

The recording medium of the present teaching resides in a recording medium having a coating layer formed on a base material, wherein the coating layer is formed by using the fixing agent that contains the water-soluble polymer having diallyl amines as a constituent unit. Namely, the coating layer contains the water-soluble polymer having diallyl amines as a constituent unit.

In relation to the recording medium of the present teaching, the base material is exemplified, for example, by cloth (fabric) and recording paper. The formation of the coating layer on the base material can be carried out, for example, in the same manner as the method for applying the fixing agent on the recording medium in the recording method of the present teaching described above.

<Fixing Agent>

Subsequently, the fixing agent of the present teaching is explained.

The fixing agent of the present teaching is a fixing agent for fixing a dye in the water-based ink for ink-jet recording to the recording medium. The fixing agent contains the water-soluble polymer having diallyl amines as a constituent unit. The fixing agent may further contain a humectant, a penetrant, and water. The humectant may contain glycerol and the penetrant may contain triethylene glycol n-butyl ether.

The preparation of the fixing agent is performed, for example, in the same manner as the preparation of the fixing agent used for the ink set of the present teaching described above.

EXAMPLES

Next, Examples of the present teaching are explained together with Comparative Examples. Note that the present teaching is not limited to and restricted by Examples and Comparative Examples described below.

<Preparation of Water-Based Ink>

Respective components of ink compositions (Table 1) were mixed uniformly or homogeneously. After that, obtained mixtures were filtrated by using a polytetrafluoroethylene (PTFE) type membrane filter (pore size: 0.20 μm) produced by Toyo Roshi Kaisha, Ltd., and thus a water-based yellow ink for ink-jet recording Y, a water-based magenta ink for ink-jet recording M, and water-based cyan inks for ink-jet recording C1, C2 were obtained.

Table 1 (Following)—Legend

*1: Produced by Nissin Chemical Industry Co., Ltd.; the numerical value in Table 1 represents an active ingredient amount

*2: Produced by Lion Corporation; active ingredient: 28% by weight; the numerical value in Table 1 represents an active ingredient amount

TABLE 1

| | | | Y | M | C1 | C2 |
|---|---|---|---|---|---|---|
| ink composition (% by weight) | dye | C.I. Direct Yellow 86 | 4 | — | — | — |
| | | C.I. Direct Red 83 | — | 4 | — | — |
| | | C.I. Direct Blue 199 | — | — | 4 | — |
| | | C.I. Acid Blue 90 | — | — | — | 4 |
| | humectant | glycerol | 20 | 20 | 20 | 20 |
| | penetrant | triethylene glycol n-butyl ether | 2 | 2 | 2 | 2 |
| | surfactant | Olfine (trade name) E1010 (*1) | 0.2 | 0.2 | 0.2 | 0.2 |
| | | Sunnol (trade name) NL1430 (*2) | 0.2 | 0.2 | 0.2 | 0.2 |
| | | water | balance | balance | balance | balance |

<Preparation of Fixing Agent>

Respective components of compositions of the fixing agent (Table 2) were mixed uniformly or homogeneously to obtain 15 kinds of fixing agents.

Examples 1 to 9 and Comparative Examples 1 to 6

The water-based yellow ink Y, the water-based magenta ink M, and the water-based cyan ink C1 or C2 indicated in Table 1 were combined with the 15 kinds of fixing agents indicated in Table 2, and thus ink sets of Examples 1 to 9 and Comparative Examples 1 to 6 were obtained.

(a) Image quality evaluation (color difference between recording paper and cotton), (b) fixing performance evaluation (color difference in cotton before and after the cotton is washed with water), and (c) texture evaluation were carried out by means of the following methods with the ink sets of Examples 1 to 9 and Comparative Examples 1 to 6.

(a) Image quality evaluation (color difference between recording paper and cotton)

<Measurement of Colors of Evaluation Sample Using Recording Paper>

Evaluation samples were prepared by recording single color patches of yellow, magenta, and cyan on sheets of recording paper ("Super White+" produced by ASKUL Corporation) by using the water-based inks included in the ink sets of Examples and Comparative Examples by using an ink-jet printer-equipped digital multifunction machine DCP-J4225N produced by Brother Industries, Ltd. The colors ($L^*_1$, $a^*_1$, and $b^*_1$) of the respective color patches of the evaluation samples were measured by a spectrophotometer Spectrolino produced by Gretag Macbeth (measurement field: 2°; white reference: Abs (absolute white); light source: D50; density reference: ANSI T). Each measurement result of the colors ($L^*_1$, $a^*_1$, and $b^*_1$) is an average value of those obtained by the measurement performed three times.

<Measurement of Colors of Evaluation Sample Using Cotton>

1 g of the fixing agent included in each of the ink sets of Examples and Comparative Examples was uniformly applied onto cotton (sheeting) having a planar size of 15 cm×5 cm by means of the spray system. After the application of the fixing agent, the cotton was ironed and dried for 2 minutes at a high temperature (180 to 210° C.) having an upper limit of 210° C. Subsequently, single color patches of yellow, magenta, and cyan were recorded on sheets of the cotton in the same manner as in the recording paper by using the ink-jet printer-equipped digital multifunction machine DCP-J4225N, and thus evaluation samples were prepared. The colors ($L^*_2$, $a^*_2$, and $b^*_2$) of the color patches of the cotton evaluation samples were measured in the same manner as the evaluation sample using the recording paper.

<Calculation of Color Difference ($\Delta E_1$)>

The color difference ($\Delta E_1$) between the colors of the evaluation sample using the recording paper and the colors of the evaluation sample using the cotton was calculated in accordance with the following expression, and the evaluation was performed in accordance with the following evaluation criteria.

$$\Delta E_1 = \{(L^*_1 - L^*_2)^2 + (a^*_1 - a^*_2)^2 + (b^*_1 - b^*_2)^2\}^{1/2}$$

<Evaluation Criteria for Image Quality Evaluation (Color Difference Between Recording Paper and Cotton>

A: Color difference ($\Delta E_1$) between recording paper and cotton is not more than 5.0;

B: Color difference ($\Delta E_1$) between recording paper and cotton exceeds 5.0 and less than 15.0;

C: Color difference ($\Delta E_1$) between recording paper and cotton is not less than 15.0.

(b) Evaluation of fixing performance (color difference in cotton before and after the cotton is washed with water)

Each evaluation sample using cotton in the image quality evaluation (color difference between recording paper and cotton) was washed with water for 5 minutes while shaking the sample in water to such an extent that a part of the evaluation sample was not rubbed with other portions. After the wash, each evaluation sample was dried and the colors ($L^*_3$, $a^*_3$, and $b^*_3$) of the color patches of the evaluation sample were measured in the same manner as the evaluation sample using the recording paper in the image quality evaluation (color difference between recording paper and cotton). The color difference ($\Delta E_2$) in the evaluation sample using cotton before and after the evaluation sample was washed with water was calculated in accordance with the following expression, and the evaluation was performed in accordance with the following evaluation criteria.

$$\Delta E_2 = \{(L^*_2 - L^*_3)^2 + (a^*_2 - a^*_3)^2 + (b^*_2 - b^*_3)^2\}^{1/2}$$

<Evaluation Criteria for Fixing Performance Evaluation (Color Difference in Cotton Before and after the Cotton was Washed with Water>

A: Color difference ($\Delta E_2$) before and after the cotton was washed with water is not more than 5.0;

B: Color difference ($\Delta E_2$) before and after the cotton was washed with water exceeds 5.0 and less than 15.0;

C: Color difference ($\Delta E_2$) before and after the cotton was washed with water is not less than 15.0.

(c) Texture Evaluation 10 examinees touched their fingers to each evaluation sample using cotton in the image quality evaluation (color difference between recording paper and cotton) and cotton which was subjected neither to application of the fixing agent nor to application of the water-based ink (hereinafter also referred to as an original cotton). The number of examinees who felt that the evaluation sample was harder than the original cotton was summed up, and the evaluation was performed in accordance with the following evaluation criteria.

<Evaluation Criteria for Texture Evaluation>

A: The number of examinees who felt that the evaluation sample was harder than the original cotton was not more than two among ten examinees;

B: The number of examinees who felt that the evaluation sample was harder than the original cotton was three or four among ten examinees;

C: The number of examinees who felt that the evaluation sample was harder than the original cotton was not less than five among ten examinees.

Table 2 shows the compositions of the fixing agents and the evaluation results of Examples 1 to 9 and Comparative Examples 1 to 6. In Table 2, "PAA (trade name)-01" and "PAA (trade name)-05" indicate a cationic polymer represented by Formula (11); "polyethylenimine" indicates a cationic polymer represented by Formula (12); "POVAL (trade name) PVA 203" indicates a nonionic polymer represented by Formula (13); and "PITZCOL (trade name) K-17L" and "PITZCOL (trade name) K 30AL" indicate a nonionic polymer represented by Formula (14). Note that "Y" referred to in the column of the evaluation of Table 2 indicates the evaluation obtained for the ink set prepared by the combination with the water-based yellow ink Y indicated in Table 1, "M" indicates the evaluation obtained for the ink set prepared by the combination with the water-based magenta ink M indicated in Table 1, and each of "C1" and "C2" indicates the evaluation obtained for the ink set prepared by the combination with the water-based cyan ink C1 or C2 indicated in Table 1.

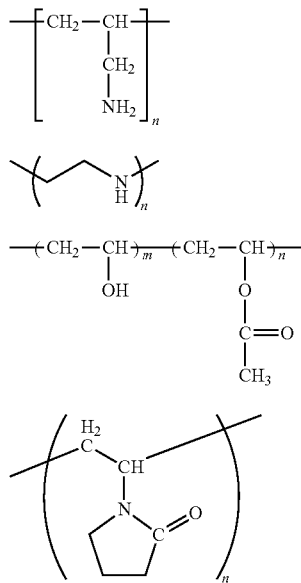

Table 2 (Following)—Legend

*3: a water-soluble polymer having diallyl amines represented by Formula (2) as a constituent unit; produced by SENKA corporation; the weight-average molecular weight: more than 5,000 but less than 20,000

*4: a water-soluble polymer having diallyl amines represented by Formula (2) as a constituent unit; produced by SENKA corporation; the weight-average molecular weight: 20,000 to 100,000

*5: a water-soluble polymer having diallyl amines represented by Formula (1) and a unit represented by Formula (3) as constituent units; produced by SENKA corporation; the weight-average molecular weight: 20,000 to 100,000

*6: a water-soluble polymer having diallyl amines represented by Formula (1) as a constituent unit; produced by Nittobo Medical Co., Ltd.; the weight-average molecular weight: 20,000

*7: a water-soluble polymer having diallyl amines represented by Formula (1) as a constituent unit; produced by Nittobo Medical Co., Ltd.; the weight-average molecular weight: 5,000

*8: a water-soluble polymer having diallyl amines represented by Formula (2), a unit represented by Formula (4), and a unit represented by Formula (5) as constituent units; produced by Nittobo Medical Co., Ltd.; the weight-average molecular weight: 20,000

*9: a water-soluble polymer having diallyl amines represented by Formula (2) and a unit represented by Formula (4) as constituent units; produced by Nittobo Medical Co., Ltd.; the weight-average molecular weight: 30,000

*10: a cationic polymer represented by Formula (11); produced by Nittobo Medical Co., Ltd.; the weight-average molecular weight: 1,600

*11: a cationic polymer represented by Formula (11); produced by Nittobo Medical Co., Ltd.; the weight-average molecular weight: 5,000

*12: a cationic polymer represented by Formula (12); produced by Junsei Chemical Co., Ltd.; the weight-average molecular weight: 1,200

*13: a nonionic polymer represented by Formula (13); produced by KURARAY CO. LTD.; the weight-average molecular weight: 15,000

*14: a nonionic polymer represented by Formula (14); produced by Dai-ichi Kogyo Seiyaku Co., Ltd.; the weight-average molecular weight: 9,000

*15: a nonionic polymer represented by Formula (14); produced by Dai-ichi Kogyo Seiyaku Co., Ltd.; the weight-average molecular weight: 45,000

TABLE 2

| | | | | Example | | | | | | | | |
|---|---|---|---|---|---|---|---|---|---|---|---|---|
| | | | | 1 | 2 | 3 | 4 | 5 | 6 | 7 | 8 | 9 |
| fixing agent composition (% by weight) | polymer | water-soluble polymer having diallyl amines as a constituent unit | UNISENCE FPA 100 LU (*3) | 4.00 | 5.00 | 10.00 | — | — | — | — | — | — |
| | | | UNISENCE FPA 101 LU (*4) | — | — | — | 10.00 | — | — | — | — | — |
| | | | UNISENCE KCA 103 LU (*5) | — | — | — | — | 10.00 | — | — | — | — |
| | | | PAS-M-1A (*6) | — | — | — | — | — | 10.00 | — | — | — |
| | | | PAS-21 (*7) | — | — | — | — | — | — | 10.00 | — | — |
| | | | PAS-84 (*8) | — | — | — | — | — | — | — | 10.00 | — |
| | | | PAS-2451 (*9) | — | — | — | — | — | — | — | — | 10.00 |
| | | cationic polymer | PAA (trade name)-01 (*10) | — | — | — | — | — | — | — | — | — |
| | | | PAA (trade name)-05 (*11) | — | — | — | — | — | — | — | — | — |
| | | | polyethyleneimine 1200 (*12) | — | — | — | — | — | — | — | — | — |
| | | nonionic polymer | POVAL (trade name) PVA 203 (*13) | — | — | — | — | — | — | — | — | — |
| | | | PITZCOL (trade name) K-17L (*14) | — | — | — | — | — | — | — | — | — |
| | | | PITZCOL (trade name) K-30AL (*15) | — | — | — | — | — | — | — | — | — |

TABLE 2-continued

| | | | | | | | | | | | | |
|---|---|---|---|---|---|---|---|---|---|---|---|---|
| | humectant | glycerol | | 4.00 | 4.00 | 4.00 | 4.00 | 4.00 | 4.00 | 4.00 | 4.00 | 4.00 |
| | penetrant | triethylene glycol n-butyl ether | | 1.00 | 1.00 | 1.00 | 1.00 | 1.00 | 1.00 | 1.00 | 1.00 | 1.00 |
| | | water | | balance | balance | balance | balance | balance | balance | balance | balance | balance |
| evaluation | image quality (color difference between recording paper and cotton) | | Y ($\Delta E_1$) | B (7.2) | A (4.9) | A (3.9) | B (6.8) | B (9.6) | B (9.0) | B (6.0) | B (9.6) | B 11.5) |
| | | | M ($\Delta E_1$) | A (4.6) | A (4.1) | A (3.6) | A (4.1) | B (7.4) | B (9.2) | B (10.6) | B (8.8) | B (8.1) |
| | | | C1 ($\Delta E_1$) | B (5.6) | A (4.8) | A (4.9) | B (5.3) | B (9.9) | B (8.8) | B (9.7) | B (9.8) | B 10.3) |
| | | | C2 ($\Delta E_1$) | — | — | A (5.0) | — | — | — | — | — | — |
| | fixing performance (color difference in cotton before and after the cotton was washed with water) | | Y ($\Delta E_2$) | B (9.3) | A (4.7) | A (2.7) | B (9.6) | A (2.5) | A (2.8) | B (8.2) | A (2.6) | A (2.5) |
| | | | M ($\Delta E_2$) | B (7.1) | A (3.6) | A (3.2) | A (2.2) | A (4.0) | A (3.6) | A (4.7) | A (3.0) | B (6.1) |
| | | | C1 ($\Delta E_2$) | A (2.6) | A (2.2) | A (1.2) | A (2.5) | A (1.4) | B (8.1) | A (2.5) | A (3.1) | B (8.2) |
| | | | C2 ($\Delta E_2$) | — | — | A (2.4) | — | — | — | — | — | — |
| | texture | | | A | A | A | A | B | A | A | B | B |

| | | | | Comparative Example | | | | | |
|---|---|---|---|---|---|---|---|---|---|
| | | | | 1 | 2 | 3 | 4 | 5 | 6 |
| fixing agent composition (% by weight) | polymer | water-soluble polymer having diallyl amines as a constituent unit | UNISENCE FPA 100 LU (*3) | — | — | — | — | — | — |
| | | | UNISENCE FPA 101 LU (*4) | — | — | — | — | — | — |
| | | | UNISENCE KCA 103 LU (*5) | — | — | — | — | — | — |
| | | | PAS-M-1A (*6) | — | — | — | — | — | — |
| | | | PAS-21 (*7) | — | — | — | — | — | — |
| | | | PAS-84 (*8) | — | — | — | — | — | — |
| | | | PAS-2451 (*9) | — | — | — | — | — | — |
| | | cationic polymer | PAA (trade name)-01 (*10) | 10.00 | — | — | — | — | — |
| | | | PAA (trade name)-05 (*11) | — | 10.00 | — | — | — | — |
| | | | polyethyleneimine 1200 (*12) | — | — | 10.00 | — | — | — |
| | | nonionic polymer | POVAL (trade name) PVA 203 (*13) | — | — | — | 10.00 | — | — |
| | | | PITZCOL (trade name) K-17L (*14) | — | — | — | — | 10.00 | — |
| | | | PITZCOL (trade name) K-30AL (*15) | — | — | — | — | — | 10.00 |
| | humectant | glycerol | | 4.00 | 4.00 | 4.00 | 4.00 | 4.00 | 4.00 |
| | penetrant | triethylene glycol n-butyl ether | | 1.00 | 1.00 | 1.00 | 1.00 | 1.00 | 1.00 |
| | | water | | balance | balance | balance | balance | balance | balance |
| evaluation | image quality (color difference between recording paper and cotton) | | Y ($\Delta E_1$) | A (4.7) | A (4.6) | A (2.9) | A (3.8) | B (8.4) | A (3.9) |
| | | | M ($\Delta E_1$) | B (7.7) | B (9.1) | B (5.8) | A (0.7) | B (6.6) | B (5.8) |
| | | | C1 ($\Delta E_1$) | B (11.6) | B (10.9) | B (8.0) | A (4.2) | B (8.8) | A (4.7) |
| | | | C2 ($\Delta E_1$) | — | — | — | — | — | — |
| | fixing performance (color difference in cotton before and after the cotton was washed with water) | | Y ($\Delta E_2$) | C (15.9) | A (4.8) | C (45.3) | C (32.2) | C (37.3) | C (47.4) |
| | | | M ($\Delta E_2$) | B (9.8) | B (5.6) | B (11.4) | C (30.1) | C (40.8) | C (38.5) |
| | | | C1 ($\Delta E_2$) | A (3.0) | A (3.3) | C (25.7) | C (46.8) | C (44.7) | C (46.4) |
| | | | C2 ($\Delta E_2$) | — | — | — | — | — | — |
| | texture | | | B | C | A | A | A | A |

As indicated in Table 2, in Examples 1 to 9, the evaluation results were satisfactory in relation to the image quality (color difference between the recording paper and the cotton), the fixing performance (color difference in cotton before and after the cotton was washed with water), and texture. Especially, in relation to Example 2 in which the blending amount of the water-soluble polymer having diallyl amines as a constituent unit in the fixing agent was 5% by weight and Example 3 in which the blending amount of the water-soluble polymer having diallyl amines as a constituent unit in the fixing agent was 10% by weight, their evaluation results of the image quality (color difference between the recording paper and the cotton) and the fixing performance (color difference in cotton before and after the cotton was washed with water) were especially superior to Example 1 in which the conditions were identical except for the condition in which the blending amount of the water-soluble polymer was 4% by weight. In relation to Example 3 in which the weight-average molecular weight of the water-soluble polymer in the fixing agent exceeded 5,000 but less than 20,000, the evaluation results of the image quality (color difference between the recording paper and the cotton) and the fixing performance (color difference in cotton before and after the cotton was washed with water) were superior to each of Examples 4 to 9 in which the conditions were identical except for the condition in which the weight-average molecular weight of the water-soluble polymer in the fixing agent was not more than 5,000 or not less than 20,000. In relation to each of Examples 3, 4, 6, and 7 in which the water-soluble polymer in the fixing agent only contained diallyl amines represented by the formula (1) as a constituent unit or diallyl amines represented by the formula (2) as a constituent unit, the evaluation result of the texture was superior to each of Examples 5, 8, and 9 in which the conditions were identical except for the condition in which the water-soluble polymer contained any other constituent unit than diallyl amines represented by the formula (1) and diallyl amines represented by the formula (2). In relation to each of Examples 3 and 4 in which the water-soluble polymer in the fixing agent was a water-soluble polymer only having diallyl amines represented by the Formula (2) as a constituent unit, the evaluation result of the image quality (color difference between the recording paper and the cotton) was superior to each of Examples 5 to 9 in which the conditions were identical except for the condition in which the water-soluble polymer contained any other constituent unit than diallyl amines represented by Formula (2).

In relation to each of Comparative Examples 1 to 6 using the cationic polymer or the nonionic polymer not having diallyl amines as a constituent unit, the evaluation result of any of the fixing performance (color difference in cotton before and after the cotton was washed with water) and the texture was unsatisfactory.

As described above, the ink set of the present teaching can be utilized both for the recording on the recording paper and the recording on the recording medium other than the recording paper. The way of use of the ink set of the present teaching is not particularly limited. The ink set of the present teaching is widely applicable to various types of the ink-jet recording.

What is claimed is:

1. An ink set comprising:
   a water-based ink for ink-jet recording containing water and one or more of a direct dye or an acid dye or a combination of the direct dye and the acid dye; and
   a fixing agent containing a water-soluble polymer having diallyl amines as a constituent unit, wherein
      the diallyl amines are one or more of diallyl amines represented by Formula (1) or diallyl amines represented by Formula (2) or a combination of diallyl amines represented by Formula (1) and Formula (2),

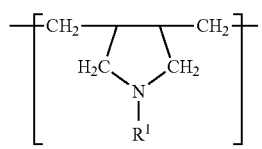
(1)

in Formula (1): $R^1$ is a hydrogen atom or a substituted or unsubstituted alkyl group, the alkyl group is a straight chain or a branched chain, and
the number of the constituent units represented by Formula (1) in the water-soluble polymer is 5 to 1,000;

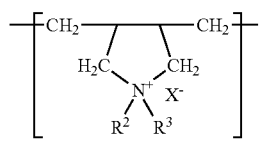
(2)

in Formula (2): each of $R^2$ and $R^3$ is a substituted or unsubstituted alkyl group, the alkyl group is a straight chain or a branched chain, and $R^2$ and $R^3$ are identical with each other or different from each other, $X^-$ is anion, and
the number of the constituent units represented by Formula (2) in the water-soluble polymer is 5 to 1,000,
wherein the fixing agent does not contain any other polymer than the water-soluble polymer having the diallyl amines as a constituent unit; and
the ink set contains only said water-soluble polymer contained in the fixing agent as a polymer component.

2. The ink set according to claim 1, wherein the water-soluble polymer has a weight-average molecular weight of more than 5,000 and less than 20,000.

3. The ink set according to claim 1, wherein the water-soluble polymer is a water-soluble polymer only having diallyl amines as a constituent unit.

4. The ink set according to claim 1, wherein the water-soluble polymer is a water-soluble polymer only having diallyl amines represented by Formula (1) as a constituent unit or a water-soluble polymer only having diallyl amines represented by Formula (2) as a constituent unit.

5. The ink set according to claim 1, wherein the water-soluble polymer is a water-soluble polymer only having diallyl amines represented by Formula (2) as a constituent unit.

6. The ink set according to claim 1, wherein the diallyl amines are diallyl amines represented by Formula (1), in Formula (1), $R^1$ is a hydrogen atom.

7. The ink set according to claim 1, wherein the diallyl amines are diallyl amines represented by Formula (2), in Formula (2), each of $R^2$ and $R^3$ is a methyl group or an ethyl group and $X^-$ is methylsulfate ion, ethylsulfate ion, or chloride ion.

8. The ink set according to claim 1, wherein a blending amount of the water-soluble polymer in an entire amount of the fixing agent is not less than 5% by weight.

9. The ink set according to claim 1, wherein a blending amount of the water-soluble polymer in an entire amount of the fixing agent is in a range of 5 to 10% by weight.

10. The ink set according to claim 1, wherein the fixing agent further contains glycerol and triethylene glycol-n-butyl ether.

11. The ink set according to claim 1,
    wherein a ratio (P/D), of the ink set, ranges between 0.2 and 5,
    P: a blending amount (% by weight), in an entire amount of the fixing agent, of the water-soluble polymer having the diallyl amines as a constituent unit, and
    D: a blending amount (% by weight), in an entire amount of the water-based ink, of the one or more of the direct dye or the acid dye or the combination of the direct dye and the acid dye.

12. The ink set according to claim 1,
    wherein a ratio (P/D), of the ink set, ranges between 1 and 2.5,
    P: a blending amount (% by weight), in an entire amount of the fixing agent, of the water-soluble polymer having the diallyl amines as a constituent unit, and
    D: a blending amount (% by weight), in an entire amount of the water-based ink, of the one or more of the direct dye or the acid dye or the combination of the direct dye and the acid dye.

13. An ink set comprising:
    a water-based ink for ink-jet recording containing water and one or more of a direct dye or an acid dye or a combination of the direct dye and the acid dye; and
    a fixing agent containing a water-soluble polymer having diallyl amines as a constituent unit,
    wherein
       the diallyl amines are one or more of diallyl amines represented by Formula (1) or diallyl amines represented by Formula (2) or a combination of diallyl amines represented by Formula (1) and Formula (2),

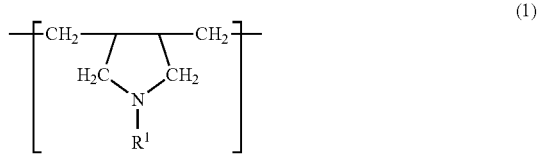
(1)

in Formula (1): $R^1$ is a hydrogen atom or a substituted or unsubstituted alkyl group, the alkyl group is a straight chain or a branched chain, and the number of the constituent units represented by Formula (1) in the water-soluble polymer is 5 to 1,000;

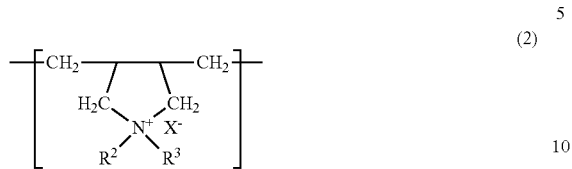
(2)

in Formula (2): each of $R^2$ and $R^3$ is a substituted or unsubstituted alkyl group, the alkyl group is a straight chain or a branched chain, and $R^2$ and $R^3$ are identical with each other or different from each other, $X^-$ is anion, and the number of the constituent units represented by Formula (2) in the water-soluble polymer is 5 to 1,000, wherein the water-soluble polymer has a weight-average molecular weight of more than 5,000 and less than 20,000; and the ink set contains only said water-soluble polymer contained in the fixing agent as a polymer component.

* * * * *